United States Patent
Ihara et al.

(10) Patent No.: US 7,887,344 B2
(45) Date of Patent: Feb. 15, 2011

(54) ELECTRONIC DEVICE WITH AN EXTERNAL CONNECTOR

(75) Inventors: Akio Ihara, Tokyo (JP); Hirohisa Tokunaga, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 0 days.

(21) Appl. No.: 12/648,491

(22) Filed: Dec. 29, 2009

(65) Prior Publication Data

US 2010/0203749 A1 Aug. 12, 2010

(30) Foreign Application Priority Data

Feb. 12, 2009 (JP) .......................... P2009-030476

(51) Int. Cl.
*H01R 13/44* (2006.01)
(52) U.S. Cl. ....................................................... 439/136
(58) Field of Classification Search ................ 439/135, 439/136
See application file for complete search history.

(56) References Cited

U.S. PATENT DOCUMENTS

| 5,793,619 A * | 8/1998 | Deguchi ..................... 361/814 |
| 7,083,439 B1 * | 8/2006 | Hayakawa et al. .......... 439/136 |
| 2007/0298318 A1 * | 12/2007 | Li ............................... 429/97 |

FOREIGN PATENT DOCUMENTS

JP 08-025086 A 1/1996

\* cited by examiner

*Primary Examiner*—Tho D Ta
(74) *Attorney, Agent, or Firm*—Workman Nydegger

(57) ABSTRACT

An electronic device with an external connector having a body having a 1st engaged portion, a connector provided on said body, a connector cap mounted on said connector having a 1st cap engagement portion, a cover attached to said body, and having a 2nd engaged portion which engaging with said 1st engaged portion, and having a 2nd cap engagement portion catching by said 1st cap engagement portion when said connector cap is mounted on said connector.

19 Claims, 3 Drawing Sheets

(a)  (b)  (c)

ELECTRONIC DEVICE WITH AN EXTERNAL CONNECTOR

CROSS-REFERENCE TO RELATED APPLICATIONS

This application is based upon and claims the benefit of priority from the prior Japanese Patent Application No. 2009-30476 filed on Feb. 12, 2009; the entire contents of which are incorporated herein by reference.

BACKGROUND OF THE INVENTION (i) Field of the Invention

The present invention relates to an electronic device having a cover, a connector, and a connector cap locking the cover.

(ii) Description of the Related Art

In recent years, various portable electronic devices having a battery cover. In such electronic device, the battery is usually detachably mounted on a battery fitting portion provided in the electronic device. To prevent the battery from dropping out of the electronic device main body due to impact or fall of the electronic device, the battery cover for covering the battery is mounted on the electronic device. Generally, the battery cover and the electronic device are provided with a convex portion and a concave portion, respectively, and if they are fitted together, the battery cover is mounted on the electronic device. Such electronic device has been disclosed (e.g., refer to Japanese Patent Publication of Unexamined Application (Kokai), No. H08-25086).

SUMMARY OF THE INVENTION

Since the battery cover is mounted through a simple operation of sliding the battery cover, there occurred a situation where the battery cover drops out because the battery cover is slid in the opposite direction to that of mounting due to impact or fall of the electronic device, releasing the fit between the engagement parts. In a state where the battery cover comes out, the battery is exposed to the outside, whereby there was a possibility that the battery is removed due to impact or fall of the electronic device, and the power of the electronic device is cut off, impairing the convenience.

This is therefore an object of the present invention to provide an electronic device capable of preventing the battery cover from dropping out due to impact or fall of the electronic device by providing the engagement parts for the connector cap and the battery cover.

The present invention has been made in view of the above circumstances, and provides an electronic device with an external connector comprising a body having a 1st engaged portion, a connector provided on said body, a connector cap mounted on said connector having a 1st cap engagement portion, a cover attached to said body, and having a 2nd engaged portion which engaging with said 1st engaged portion, and having a 2nd cap engagement portion catching by said 1st cap engagement portion when said connector cap is mounted on said connector.

BRIEF DESCRIPTION OF THE DRAWINGS

Embodiment of the present invention will be described in detail based on the following figures, wherein.

DETAILED DESCRIPTION OF THE INVENTION

The embodiments of the present invention will be described below with reference to the drawings.

Figure 1:
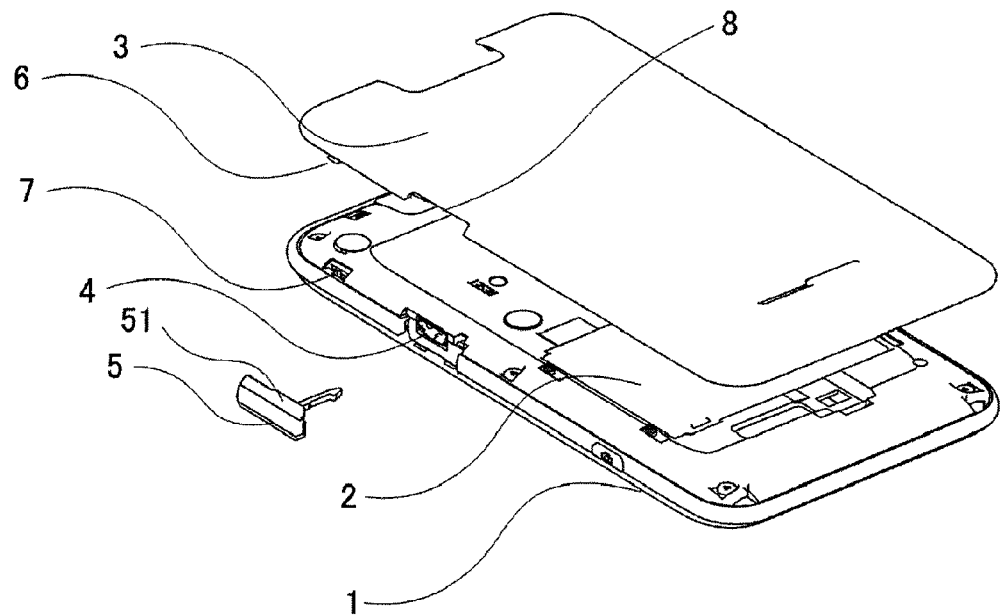
FIG. 1 shows a portable telephone set that is one example of the electronic device according to an embodiment of the present invention, as seen from the plane where the battery is mounted.
Figure 2:
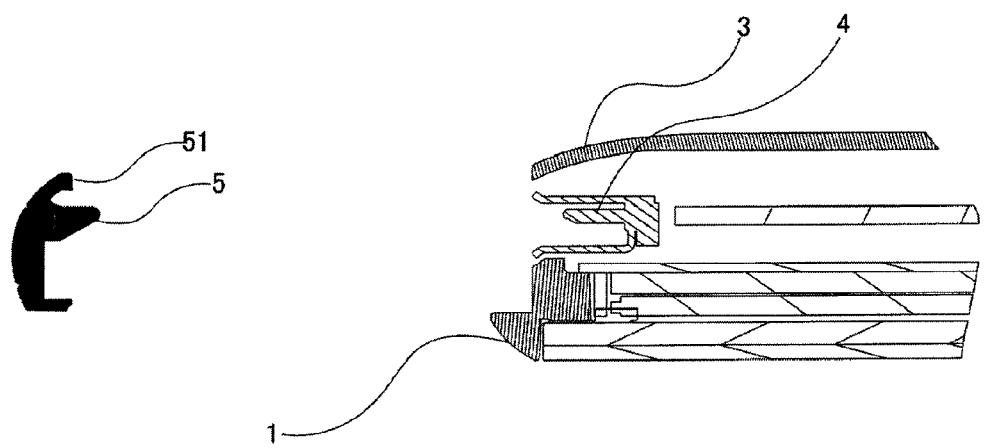
FIG. 2 shows the cross-section where the connector and the connector cap are mounted in a state where the connector cap is removed from the connector for the portable telephone set that is one example of the electronic device according to the embodiment of the invention, as seen from the long side direction of the portable telephone set.
Figure 3:
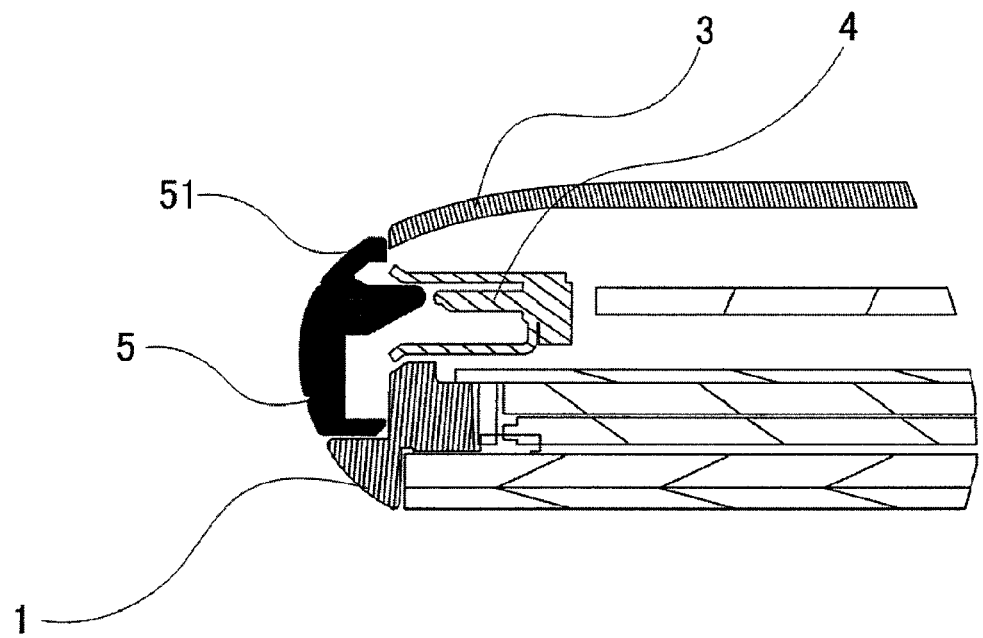
FIG. 3 shows the cross-section where the connector and the connector cap are mounted in a state where the connector cap is mounted on the connector for the portable telephone set that is one example of the electronic device according to the embodiment of the invention, as seen from the long side direction of the portable telephone set.
Figure 4:
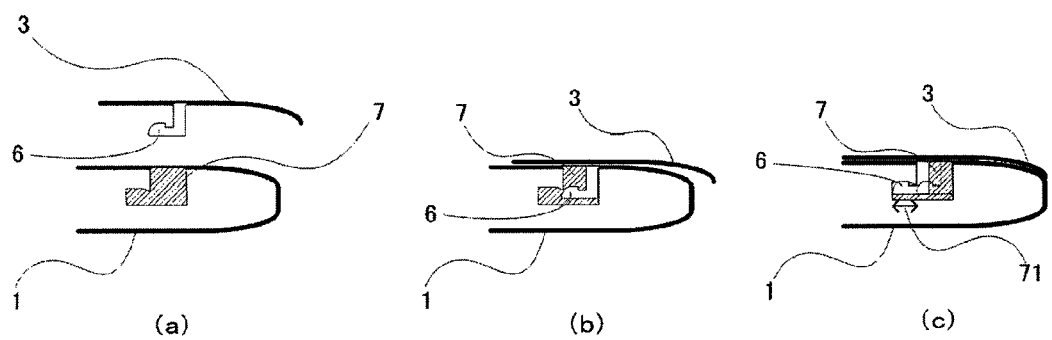
FIG. 4 shows how the convex portion and the concave portion are fitted together in accordance with the slide movement of the battery cover for the portable telephone set that is one example of the electronic device according to the embodiment of the invention, as seen from the short side direction of the portable telephone set.
Figure 5:
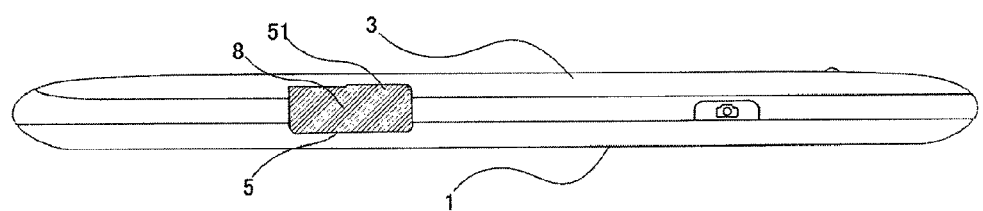
FIG. 5 shows the portable telephone set that is one example of the electronic device according to the embodiment of the invention in a state where the battery cover and the connector cap are mounted on the portable telephone set, as seen from the side face of the portable telephone set.
Figure 6:
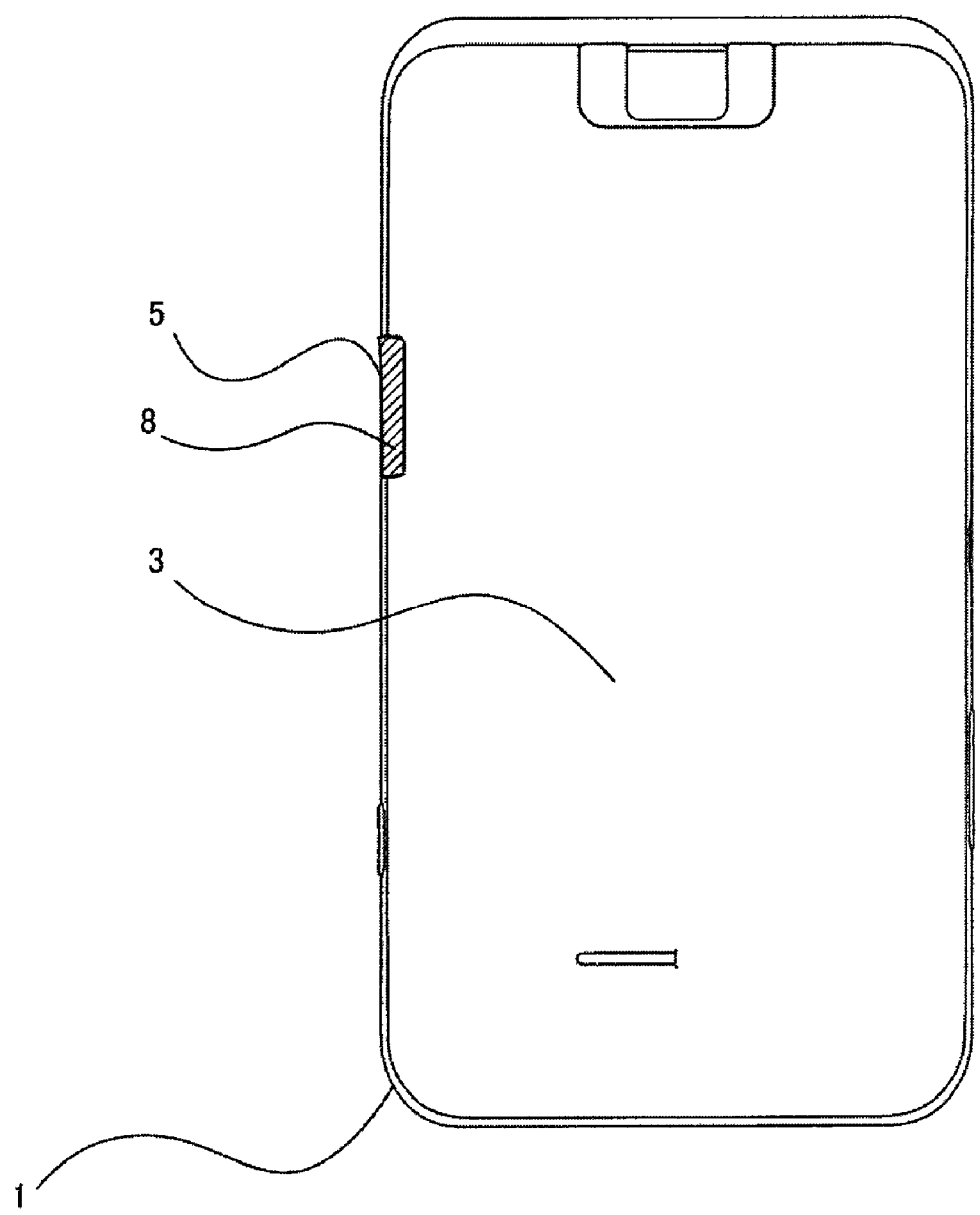
FIG. 6 shows the portable telephone set that is one example of the electronic device according to the embodiment of the invention in a state where the battery cover and the connector cap are mounted on the portable telephone set, as seen from the direction in which the battery cover of the portable telephone set is mounted.

FIG. 1 is a perspective view showing a portable telephone set 1 that is one example of an electronic device according to an embodiment of the present invention, as seen from the plane where a battery 2 is mounted. FIG. 2 is a cross-sectional view showing the cross-section where a connector 4 and a connector cap 5 are mounted, as seen from the long side direction of the portable telephone set 1. FIG. 3 is a cross-sectional view, like FIG. 2, in a state where the connector cap 5 is mounted on the connector 4. FIG. 4 is a cross-sectional view showing how one convex portion 6 and one concave portion 7 are fitted together in accordance with the slide movement of the battery cover 3. FIG. 5 is a schematic view showing a state where the battery cover 3 and the connector cap 5 are mounted on the portable telephone set 1, as seen from the side face of the portable telephone set 1. FIG. 6 is a schematic view showing a state where the battery cover 3 and the connector cap 5 are mounted on the portable telephone set 1, as seen from the plane on which the battery cover 3 is mounted.

(Configuration of Battery and Battery Cover)

The portable telephone set 1 is provided with a battery fitting portion, as shown in FIG. 1. A metal terminal of the battery fitting portion is provided at a position to make contact with a metal terminal of the battery 2, whereby two metal terminals electrically conduct by mounting the battery 2 on the battery fitting portion. The portable telephone set 1 is supplied with electric power from the battery 2 to drive an electrical board or a display device provided inside the portable telephone set 1. An implementing method for the battery 2 and a process for supplying electric power from the battery 2 to the portable telephone set 1 are well known techniques, and not described in detail.

The battery cover 3 is configured to be mounted on the portable telephone set 1, as shown in FIGS. 5 and 6. If the battery cover 3 is mounted on the portable telephone set 1, the battery 2 mounted on the battery fitting portion is held down by the battery cover 3, whereby it is possible to prevent the battery 2 from dropping out of the battery fitting portion due to vibration or fall of the portable telephone set 1. A housing of the portable telephone set 1 and the battery cover 3 are made of plastic such as polycarbonate resin, for example.

The battery cover 3 is provided with a plurality of convex portions 6, and a concave portion 7 which is located on a face of the portable telephone set is provided at a position corresponding to each convex portion 6, as shown in FIG. 1. In mounting the battery cover 3 on the portable telephone set 1, first of all, the battery cover 3 is positioned to insert the convex portion 6 into the corresponding concave portion 7, as shown in FIG. 4B. Next, the battery cover 3 is slid by a distance 71 in the left direction of FIG. 4. As will be seen from FIG. 4C, the convex portion 6 is provided with an engagement part protruding in the left direction in the figure. The engagement part of the convex portion 6 is fitted with an engagement part provided in the concave portion 7 by a slide movement of the battery cover 3, so that the battery cover 3 is mounted on the portable telephone set 1. The engagement parts of the convex portion 6 and the concave portion 7 are fitted together by sliding the battery cover 3 by the distance in the left direction of FIG. 4, as described above. Therefore, if the mounted battery cover 3 is slid by the distance 71 in the right direction of FIG. 4, the fitting is released, so that the battery cover 3 can be dismounted again from the portable telephone set 1.

(Configuration of Connector and Connector Cap)

A metal terminal is provided in the concave portion of the connector 4 on the side face of the portable telephone set 1, as shown in FIG. 1, whereby a metal terminal of the cable and the metal terminal of the connector 4 are brought into contact by inserting the cable into the connector 4, for example. Through the electrical connection between the cable and the connector 4, the portable telephone set 1 connects to an external power source or an external apparatus. Also, to avoid a situation where the fine dust mixes into the concave portion of the connector 4, the connector cap 5 is provided.

In FIGS. 2 and 3, the cross-sectional views in which the connector cap 5 is mounted on the connector 4 are shown. The connector cap 5 is formed in the convex shape. And the convex shape is inserted into the concave portion of the connector 4 when the connector cap 5 is attached to the connector 4. The convex shape preferably made of elastic materials, and preferably fits to the concave portion to fix the connector cap 5 to the connector 4. When the portable telephone set 1 is connected with the external power source or the external apparatus, the connector cap 5 is removed from the connector 4, and the connector 4 is exposed to the outside and connected with the cable. The connector cap 5 is made of an elastic material such as elastomer, for example, to be simply mounted or dismounted. The connector cap 5, when mounted on the connector, is formed to protrude in a direction perpendicular to the slide direction of the battery cover 3.

(Engagement Between Battery Cover and Connector Cap)

The battery cover 3 is provided with a notch 8, as shown in FIG. 1. In FIGS. 5 and 6, a state where the battery cover 3 and the connector cap 5 are mounted on the portable telephone set 1 is shown. The battery cover 3 is mounted on the portable telephone set 1 by the slide movement of the battery cover 3 along the telephone set 1. When the battery cover 3 is mounted, the connector cap 5 can be mounted in a state where the battery cover 3 is mounted on the portable telephone set 1. When the battery cover 3 and the connector cap 5 is mounted, the notch 8 and the protrusion 51 collide against each other lateral face. The notch 8 is sized with a margin to be larger than the connector cap 5 so that the connector cap 5 may be mounted after the battery cover 3 is mounted on the portable telephone set 1. The margin between the notch 8 and the connector cap 5 in the slide movement direction is provided to be smaller than the distance 71.

As previously described, the mounting of the battery cover 3 on the portable telephone set 1 is made by inserting the convex portion 6 of the battery cover 3 into the concave portion 7 of the portable telephone set 1, and sliding the battery cover 3 by the distance 71. And dismounting the battery cover 3 is made by sliding the battery cover 3 by the distance 71 in the opposite direction to that of mounting. An operation in which the connector cap 5 is mounted on the connector 4 after the battery cover 3 is mounted on the portable telephone set 1, and then the battery cover 3 is slid in the reverse direction to that of mounting is described below. If the battery cover 3 is slid in a state where the connector cap 5 is mounted, the notch 8 provided to have a smaller margin than the distance 71 is caught by the protrusion 51 of the connector cap 5, so that the slide movement is disabled. Accordingly, when the user dismounts the battery cover 3, it is required to firstly remove the connector cap 5 from the portable telephone set 1 and slide the battery cover 3. Thereby, since the slide movement of the battery cover 3 due to impact or fall of the portable telephone set 1 is prevented, it is possible to prevent the battery cover 3 from dropping out unintentionally. That is, the connector cap 5 has both a role as the cap of the connector 4 and a role for preventing the slide movement of the battery cover 3. Therefore, there is no need for providing locking parts for preventing the slide movement of the battery cover 3, whereby the number of parts making up the portable telephone set 1 can be reduced.

The battery cover 3 is made of plastic such as polycarbonate resin, for example, and the connector cap 5 is made of an elastic material such as elastomer, as previously described. Since the connector cap 5 is made of a soft material with elasticity, the connector cap 5 absorbs the impact of collision, even when the notch 8 of the battery cover 3 collides with the protrusion 51 of the connector cap 5 due to vibration or fall of the portable telephone set 1, whereby it is possible to avoid a situation where the battery cover 3 or the connector cap 5 is broken due to collision.

With the above operation of the embodiment, the protrusion 51 of the connector cap 5 prevents the slide movement of the battery cover 3. Thereby, it is possible to prevent the battery cover 3 from dropping out carelessly because the battery cover 3 makes the slide movement due to vibration or fall of the portable telephone set 1. Also, the connector cap 5 is made of an elastic material having lower rigidity than the battery cover 3. Thereby, the connector cap 5 can absorb the impact between the connector cap 5 and the notch 8 occurring due to vibration or fall of the portable telephone set 1, preventing a situation where the members are broken.

In the embodiments as described herein, the portable telephone set has been employed. However, the scope of the invention is not limited to those embodiments, but the invention may be applied to a PDA (Personal Digital Assistant), a wire terminal or a small information processing apparatus without having a communication function, for example. Also, in the above embodiments, polycarbonate resin and elastomer are adopted as the examples of the material for the portable telephone set 1, the battery cover 3 and the connector cap 5. However, the material of the electronic device for use in the invention is not limited to them, for example, rubber materials, metal materials, carbon materials, or various materials may be employed.

According to an embodiment of the invention, it is possible to provide the electronic device capable of preventing the battery cover from dropping out due to impact or fall of the electronic device because the connector cap is provided at the position to be engaged with the battery cover mounted by slide movement.

In essence, the invention is not limited to the above embodiments, and the components may be varied and embodied without departing from the spirit or scope of the invention. Also, various inventions may be made with appropriate combinations of a plurality of components as disclosed in the above embodiments. For example, some components may be deleted from all the components as described in the above embodiments.

What is claimed is:

1. An electronic device comprising:
    a body having a first engaging portion;
    an external connector provided on said body;
    a connector cap which is mounted on said external connector, and which has a first cap engagement portion; and
    a cover which: (i) is adapted to slide along the body in a first direction to detachably attach to said body, (ii) has a second engaging portion that engages with said first engaging portion, and (iii) has a second cap engagement portion along a side thereof extending in said first direction, wherein said first cap engagement portion catches said second cap engagement portion when said cover is attached to said body and said connector cap is mounted on said connector.

2. The electronic device as claimed in claim 1, wherein said first cap engagement portion is a protrusion, and said second cap engagement portion is a notch.

3. The electronic device with as claimed in claim 1, wherein said first cap engagement portion is a protrusion, and said second cap engagement portion is a notch, and
    wherein said first engaging portion is a concave portion, and said second engaging portion is a convex portion which engaging engages with said concave portion when said cover is slid along said body in said first direction.

4. The electronic device as claimed in claim 1, wherein said connector is provided on a side of said body.

5. The electronic device as claimed in claim 1, further comprising a battery which supplies electric power to said body, and which is provided between said cover and said body.

6. The electronic device as claimed in claim 1, wherein said first cap engagement portion has lower rigidity than said cover.

7. The electronic device as claimed in claim 1, wherein said first cap engagement portion is made of an elastic material.

8. The electronic device as claimed in claim 1, wherein said first cap engagement portion is made of at least one of an elastomer material and a rubber material.

9. The electronic device as claimed in claim 1, wherein said cover is made of a polycarbonate resin.

10. A method of locking a cover of an electronic device including a connector provided on a side of a body of the electronic device, and a connector cap provided on said connector, wherein said cover is detachably attached to said body, the method comprising:
    attaching said cover to said body by sliding said cover along said body in a first direction so as to engage a first engaging portion provided on said body with a second engaging portion provided on said cover; and
    mounting said connector cap on said connector such that a first cap engagement portion provided on said connector cap catches a second cap engagement Portion provided on and along a side of the attached cover extending in said first direction.

11. The method as claimed in claim 10, wherein mounting said connector cap on said connector comprises inserting said connector cap in an inserting direction, which is perpendicular to said first direction, such that said first cap engagement portion and said second cap engagement portion collide against lateral faces of each other.

12. An electronic device comprising:
    a body having first engaging means for engaging;
    external connecting means for connecting;
    connector capping means for capping said external connecting means on said body; and
    covering means for covering said body by sliding said covering means along the body in a first direction to detachably attach to said body, wherein said covering means includes: (i) second engaging means for engaging with said first engaging means, and having (ii) cap engaging means for disabling sliding movement of said covering means by being caught by said connector capping means, when said covering means is attached to said body and said connector capping means is mounted on said connecting means.

13. The electronic device as claimed in claim 12, wherein said second engaging means engages with said first engaging means when said covering means is slid along said body in said first direction.

14. The electronic device as claimed in claim 12, wherein said connecting means is provided on a side of said body.

15. The electronic device as claimed in claim 12 further comprising supplying means for supplying electric power to said body, wherein said supplying means is provided between said covering means and said body.

16. The electronic device as claimed in claim 12, wherein said connector capping means has lower rigidity than said covering means.

17. The electronic device as claimed in claim 12, wherein said engaging connector capping means is made of an elastic material.

18. The electronic device as claimed in claim 12, wherein said connector capping means is made of at least one of an elastomer material and a rubber material.

19. The electronic device as claimed in claim 12, wherein said covering means is made of a polycarbonate resin.

* * * * *